United States Patent [19]

Sugitani et al.

[11] Patent Number: 4,509,063

[45] Date of Patent: Apr. 2, 1985

[54] INK JET RECORDING HEAD WITH DELAMINATING FEATURE

[75] Inventors: Hiroshi Sugitani, Machida; Tadayoshi Inamoto; Masami Yokota, both of Hiratsuka, all of Japan

[73] Assignee: Canon Kabushiki Kaisha, Tokyo, Japan

[21] Appl. No.: 514,591

[22] Filed: Jul. 18, 1983

[30] Foreign Application Priority Data

Jul. 26, 1982 [JP] Japan ................................ 57-128867

[51] Int. Cl.³ ................................................ G01D 15/16

[52] U.S. Cl. .................................................. 346/140 R

[58] Field of Search .................................. 346/140 PD

[56] References Cited

U.S. PATENT DOCUMENTS 3,469,180 9/1969 Anderson ............................ 324/320
3,577,067 5/1971 Weaver ............................... 324/320
4,412,224 10/1983 Sugitani ....................... 346/140 PD
4,417,251 11/1983 Sugitani ........................ 346/140 PD
4,437,100 3/1984 Sugitani et al. .............. 346/140 PD
4,456,881 6/1984 Compton ............................. 324/319
4,467,303 8/1984 Laskaris .............................. 335/216

*Primary Examiner*—E. A. Goldberg
*Assistant Examiner*—Patrick W. Foster
*Attorney, Agent, or Firm*—Fitzpatrick, Cella, Harper & Scinto

[57] ABSTRACT

An ink jet recording head is made by laminating on a substrate a cured photosensitive resin film for forming ink pathways on the substrate and a cover of said pathways are provided. In the head, the thicknesses of the wall defining the ink pathways, the grooves and the spaces are not more than 15 times the thickness of the cured photosensitive resin film. Such ratio of the wall thickness to the film thickness and the existence of grooves and spaces serve to prevent the peeling-off at the lamination interfaces.

2 Claims, 12 Drawing Figures

INK JET RECORDING HEAD WITH DELAMINATING FEATURE-

BACKGROUND OF THE INVENTION

1. Field of the Invention

This invention relates to an ink jet recording head, and more particularly this invention relates to an ink jet recording head which produces recording ink droplets for so-called ink jet recording system.

2. Description of the Prior Art

An ink jet recording head used for an ink jet recording system is usually provided with fine ink discharging outlets (orifices), ink pathways, and ink discharging pressure generating portion in the ink pathway.

There are previously known as methods for fabricating an ink jet recording head. For example procedure of cutting or etching a glass or metal plate to form fine grooves and binding it to a plate to form ink pathways.

However, the ink discharging characteristics of the ink jet recording head made by such conventional procedures are liable to fluctuate because of excessive roughness of the internal walls of the ink pathways made by cutting or distortions in the ink pathways due to the differences of the etching degree and because of the difficulty of maintaining a constant flow resistance of the pathways. There are also drawbacks that the plates are liable to be chipped off or broken during the cutting process, resulting in low fabrication yields of the ink jet recording heads. And further, the conventional etching methods have common shortcomings of the lack of mass productivity because of the difficulty of registering the grooved plate and the cover plate equipped with driving elements such as piezoelectric elements and heating elements and the like, where they are bonded together.

In order to overcome these shortcomings, there has been proposed an ink jet recording head, see, for example, Japanese laid-open patent Appln. No. 43876/1982 wherein ink pathways are formed from cured photosensitive resin film on a substrate equipped with pressure-generating elements for ink discharge and then a cover is placed on said ink pathways.

The fabrication of the ink jet recording head by utilizing photosensitive resin is superior to conventional fabrication processes because it overcomes such shortcomings of the conventional ink heads as the lack of finishing accuracy of the ink pathways, the complexity of the fabrication process, and low yield. Yet there still remains a problem of insufficient bonding between the substrate having the pressure elements for ink discharge and the pathway walls formed from a cured photosensitive resin film on a substrate. In other words, too large shrinking stress formed in the cured photosensitive film causes insufficient adhesion of the pathway wall onto the substrate, leading to frequent occurrence of peeling-off of the pathway formed on the substrate after the head is completed.

There are provided elements for generating ink discharging pressure and electric wires for transmitting electric signals thereto, and an electric insulating layer and an ink-resistant layer are laminated thereon, but the constriction stress in the ink pathway of the cured photosensitive resin film is so large that peeling-off of the electric insulating layer or ink-resistant layer from the substrate often occurs besides that of the ink-pathway itself.

SUMMARY OF THE INVENTION

An object of the present invention is to provide an ink jet recording head which overcomes the drawbacks of the prior art such as variation of the ink discharging characteristics, low fabrication yield of the ink heads, and many fabrication steps.

Another object of the present invention is to provide an ink jet recording head which is fabricated at low cost and is precise, reliable and durable against repetitive use.

According to one aspect of the present invention, there is provided an ink jet recording head made by laminating on a substrate a cured photosensitive resin film for forming ink pathways on said substrate and a cover of said pathways, characterized in that the wall thickness of said ink pathways formed by said cured photosensitive resin film is not more than 15 times the film thickness of said cured photosensitive resin film.

According to another aspect of the present invention, there is provided an ink jet recording head made by laminating on a substrate a cured photosensitive resin film for forming ink pathways on said substrate and a cover of said pathways, characterized in that grooves and/or spaces for reducing contact area are formed between said substrate and/or said cover and the photosensitive resin film in addition to the space for ink pathways.

BRIEF DESCRIPTION OF THE DRAWINGS

FIGS. from 1 to 9 illustrate schematically the serial steps for preparation of the ink jet recording head of the present invention.

DETAILED DESCRIPTION OF THE PREFERRED EMBODIMENTS

Figure 1:
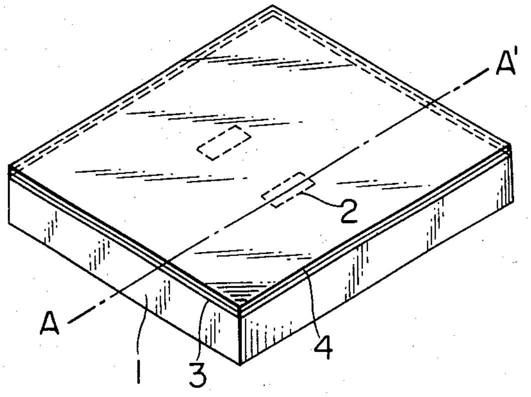

Referring now to the drawings, the present invention is to be described in detail.

FIGS. from 1 to 9 illustrate schematically the serial steps for preparation of the ink jet recording head of the present invention.

First, as is shown in FIG. 1, the desired number of the pressure generating elements 2 for ink discharging pressure are placed on a suitable substrate such as of glass, ceramic, plastic, and metals (two elements are illustrated in the figure). When used as the pressure generaterate pressure by heating the ink and, piezoelectric elements generate pressure by mechanical vibration. Electrodes for signal input are connected to the elements 2, which electrodes are not shown in the figure. elements 2, which is not shown in the figure.

Figure 2:
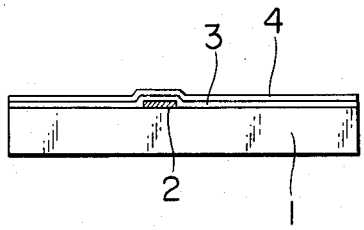

Further, if necessary, for electrical insulation and ink-resistance, there is a coating of electrical insulating layer 3 such as of $SiO_2$, $Ta_2O_5$, glass and the like, and an ink resistant layer 4 such as gold, W, Ni, Ta, Nb and the like (FIG. 2).

Figure 3:
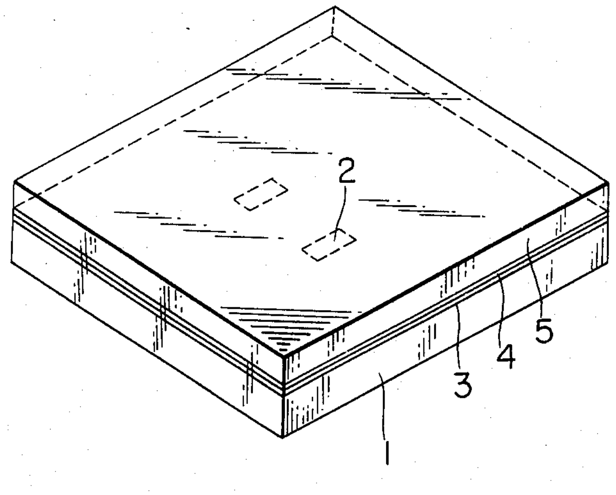

Second, after the surface of the substrate 1 equipped with the pressure generating element 2 for ink discharge is cleaned and dried, dry film photoresist 5 of 100μ thick heated at about 80°–105° C. is laminated onto the substrate surface at a rate of 0.5–4 feet/min, under a pressure of 1–3 kg/cm² (FIG. 3).

In this process, the dry film photoresist 5 is contact-bonded on the substrate surface, so that it will not be peeled off the substrate surface by the small external pressure which may be added later thereto.

Figure 4:
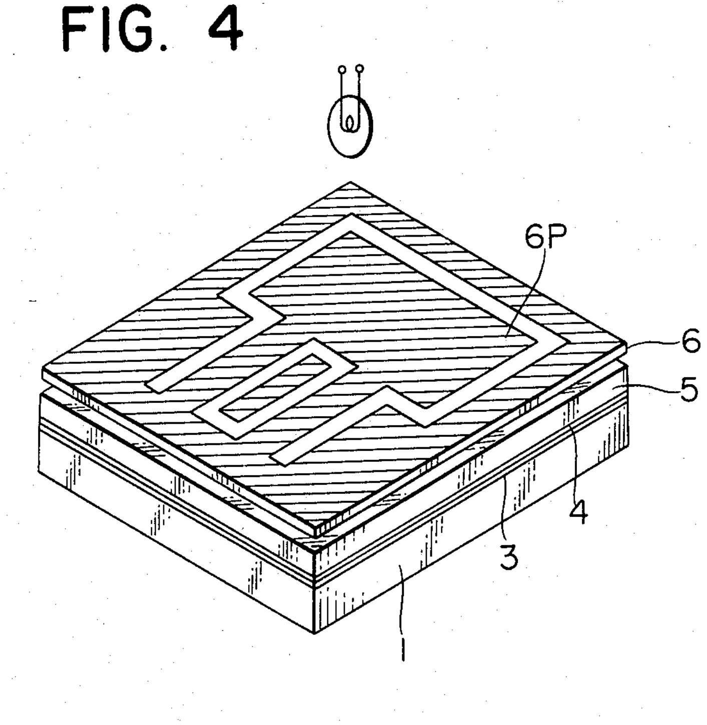

Then as is shown in FIG. 4, a photomask 6 having the required pattern 6P is superposed on the dry film photoresist 5 on the substrate surface, and it is exposed to light through the photomask 6. The pattern 6P corresponds to the region wherein the ink supply chamber, the narrow ink pathway, the ink discharge outlets, and the grooves and/or spaces to reduce the contact area are to be formed subsequently. Since the pattern 6P is opaque to light, the dry film photoresist 5 in the region covered with the pattern 6P is not exposed to light. In this procedure, the pressure generating element 2 for ink discharge needs to be placed precisely relative to the pattern 6P by the conventional procedure so that the element 2 may be placed in the narrow ink pathway to be formed.

Exposed in such a manner, the photoresist 5 outside the region of the pattern 6P polymerizes to cure and become insoluble in solvents, while photoresist 5 which is not exposed to light remains soluble in solvents.

Figure 5:
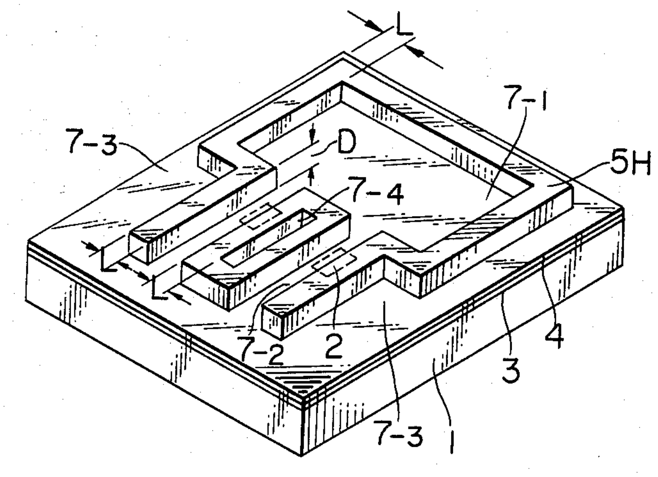

After the exposure, the dry film photoresist 5 is immersed in a volatile organic solvent such as trichloroethane to remove the unpolymerized (uncured) photoresist by dissolution, forming the recesses as is shown in FIG. 5 in conformity to the pattern 6P in the cured photoresist film 5H, which is then cured further for the purpose of increasing its resistance to solvents by means of thermal polymerization (by heating at 130°–160° C., for about 10–60 min.) or UV ray irradiation, or both.

Of the recesses thus formed in the cured photoresist film 5H, 7-1 corresponds to an ink supplying chamber in the finished ink jet head, 7-2 to a narrow ink pathway, 7-3 to a space for reducing the contact area, and 7-4 to a groove for reducing the contact area. In the ink jet recording head of the present invention, the wall thickness (L) of the cured photosensitive resin film forming the wall of the ink pathway is less than fifteen times the film thickness (D) of said cured photosensitive resin film.

An ink pathway in the present invention means not only the ink narrow pathway 7-2 but also an ink supplying chamber 7-1. The film thickness (D) refers to the thickness in the lamination direction of the cured photosensitive film, and the wall thickness (L) refers to the thickness perpendicular to D as is shown in FIG. 5. That is, the wall thickness means the thickness of the wall defining the ink pathways, the grooves, and the spaces. In this example, the thickness of the cured photosensitive resin film is about 100μ, while the thicknesses of the cured photosensitive walls are all 400μ.

Specifically, although previously the distances between the narrow ink flow pathways, and between the narrow ink flow pathway and the edges of the ink jet recording head, were determined by the position of the ink discharge outlet because the cured photosensitive resin film was filled between them, the wall thickness is adjusted to be 400μ here by forming the chamber 7-3 and the groove 7-4.

The liability to peeling-off of the cured photosensitive resin film from the substrate is governed by the value of the wall thickness relative to the film thickness as is illustrated later in Reference example, and the ratio L/D needs to be not more than 15, preferably not more than 5 in order to prevent the peeling-off completely.

Figure 6:
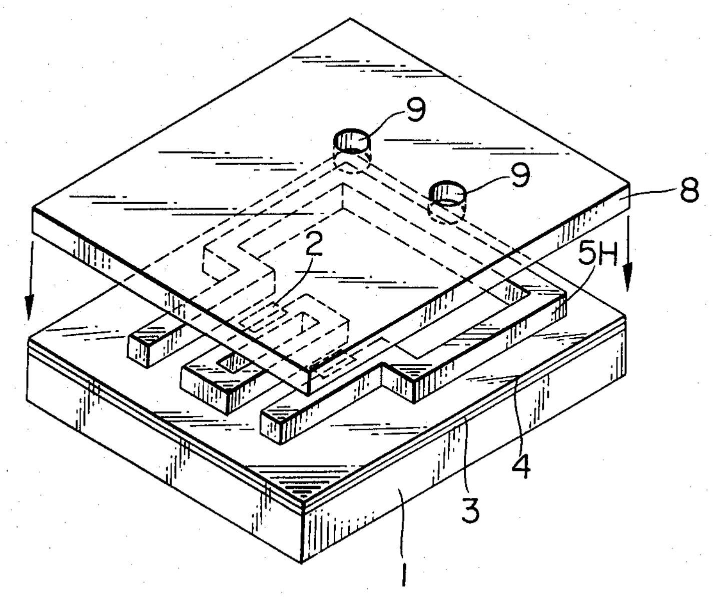

Following to the above mentioned process, a flat plate 8 is contact bonded as a cover onto the substrate plate 1 on which the walls for the ink supplying chamber 7-1, the narrow ink pathway 7-2, space 7-3, and the groove 7-4 have been formed as is shown in FIG. 6.

The concrete methods are mentioned below:

(1) An epoxy-type adhesive is coated in a thickness of 3–4μ on a flat plate of such as glass, ceramics, metal, plastics and the like by spinner coating, and the adhesive is brought to be in so-called B stage by preliminary heating. Then it is bonded onto the cured photoresist film 3H, and subjected to main curing.

(2) A flat plate of a thermoplastic resin such as an acrylic resin, ABS resin, polyethylene and the like is adhered by hot-melting directly to the cured photoresist film 5H. A through-hole 9 for connecting an ink supplying tube (not shown in the Figure.) is formed on the flat plate 8.

Figure 7:
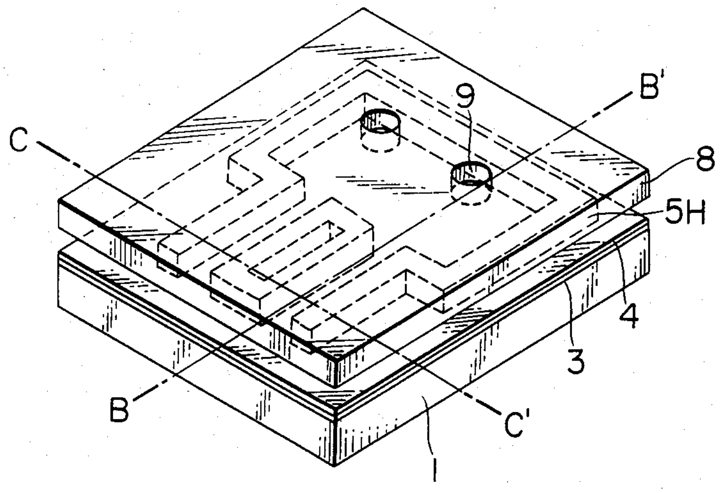

As described above, after completion of the bonding between the substrate having grooves and the flat plate, the front portion of the resulting head is cut along the line C-C′ in FIG. 7. This is done for the purpose of optimizing the distance between the pressure generating element 2 for the ink discharge and the ink discharging outlet 9 in the narrow inkflow pathways 7-2, and the region to be cut may be determined suitably as desired. For this cutting, there may be employed the dicing method conventionally used in the semiconductor industries.

Figure 8:
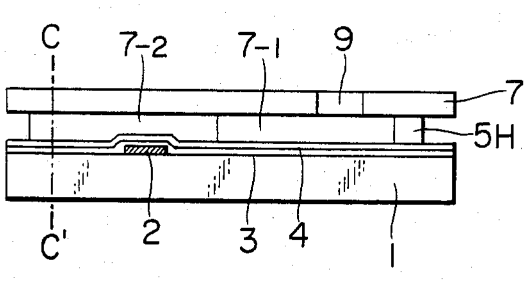
Figure 9:
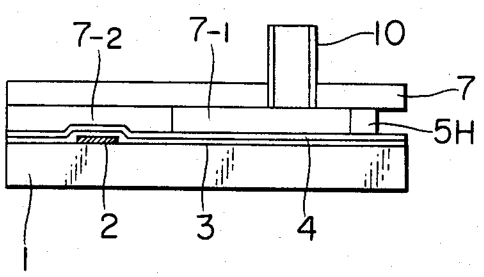

FIG. 8 is a sectional view taken along the line B-B′ in FIG. 7. And, the cut face is polished to be smooth and the ink supplying tubes 10 are mounted onto the holes 9 to complete the ink jet recording head (FIG. 9).

In the embodiments as shown in the drawings as described above, as the photosensitive composition (photoresist) for forming the grooves, there has been employed the dry film type, namely a solid, to which, however, the present invention is not limited, but a liquid photosensitive composition may also be available.

As a method for forming the coating film of this photosensitive composition on the substrate, there may be employed in case of a liquid photosensitive composition the method utilizing a squeegee used in preparation of a relief image, namely the method in which a wall with a height corresponding to the desired film thickness of the photosensitive composition is placed around the substrate and the excess of the composition is removed by means of a squeegee. Here, the photosensitive composition may have a viscosity suitably of from 100 cp to 300 cp. The height of the wall to be placed around the substrate should be decided taking into account of vaporization of the solvent component of the photosensitive composition.

On the other hand, in case of a solid photosensitive composition, the sheet of the composition is adhered to the substrate by hot pressing. In the present invention, it is advantageous to utilize a solid film type of photosensitive composition from the standpoint of ease of handling as well as easy and precise control of the thickness.

As such solid materials, there may be mentioned photosensitive resins commercially available under the trade names of Permanent Photopolymer Coating RISTON, Solder Mask 730S, 740S, 730FR, 740FR and SM1, produced by Du Pont Co. In addition, as the photosensitive composition to be used in the present invention, there may also be mentioned a number of photosensitive compositions employed in the field of photolithography in general such as photosensitive resins, photoresists, and the like. These photosensitive compositions may include, for example, diazo resins, p-diazoquinones and further photopolymerizable type photopolymers such as those employing vinyl monomers and polymerization initiators, dimerization type photopolymers employing polyvinyl cinnamate, etc. with sensitizers, mixtures of o-naphthoquinone diazide and novolac type phenol resins, mixtures of polyvinyl alcohol and diazo resins, polyether type photopolymers obtained by copolymerizing 4-glycidylethyleneoxide with benzophenone or glycidylcalcone, a copolymer of N,N-dimethylmethacrylamide with benzophenone, unsaturated polyester type photosensitive resins [e.g. APR (Asahi Kasei K.K.), Tevista (Teijin K.K.), Sonne (Kansai Paint K.K.), etc.], unsaturated urethane oligomer type photosensitive resins, photosensitive compositions comprising mixtures of bifunctional acrylic monomers with photopolymerization initiators and polymers, dichromate type photoresist, non-chromium type water soluble photoresist, polyvinyl cinnamate type photoresist, cyclized rubber-azide type photoresist, etc.

In case that the adhesion strength of the photosensitive resin onto the substrate is still insufficient even with the constitution of the ink jet recording head of the present invention, it is advisable for improving the adhesiveness that after the surface of the substrate is cleaned, an adhesion modifier such as γ-aminopropyl triethoxy silane is spin-coated on it as 1% solution ethyl alcohol at 6000 rpm, and then the photosensitive resin film is laminated onto it.

As described above in detail, the present invention has the effects as enumerated below.

1. The principal step for preparation of the ink jet recording head uses the so-called photolithographic technique, whereby the minute head portion with a desired pattern can be formed very easily. Moreover a number of heads with the same constitution and the same performance can be worked simultaneously.

2. The number the fabrication steps is relatively small so that the high productivity can be attained.

3. The registration of the positions of the main parts of the constitution and their bonding can be achieved easily and reliably so that the heads having accurate dimension can be obtained in high yield.

4. The high density multi-array ink jet recording head can be obtained in a simple manner.

5. The wall thickness of the grooves constituting the ink pathway can be adjusted very easily, and the ink pathway of the desired dimension (e.g. the depth of the groove) may be formed corresponding to the thickness of the photosensitive resin composition.

6. The concentration of the contraction stress of the cured photosensitive resin film has been avoided, resulting the increase of the adhesion strength between the substrate or the covering and the photosensitive resin as well as the prevention of the peeling-off of the ink pathway.

7. The stability of the dimension and form of the ink discharge outlet leads to the sufficient accuracy of the shot spot of the ink droplets in the repetitive use.

The effectiveness of the present invention is illustrated by the Reference example and the Examples below.

Reference example

Figure 10:
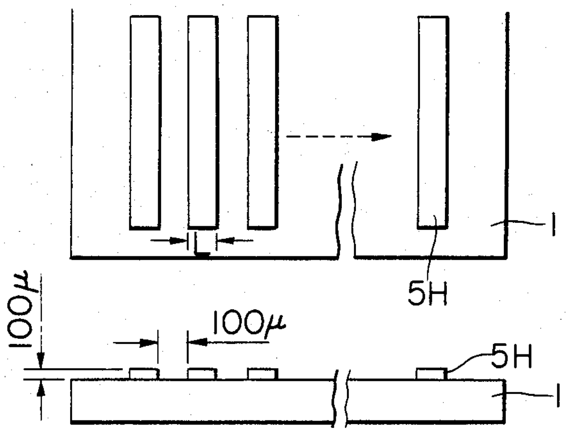
FIG. 10 shows schematically a test piece prepared in the Reference example.

A surface of a glass plate was coated with 1% solution of γ-amino propyl triethoxy silane in ethyl alcohol by spinner coating at 6000 rpm. It was heated at 80° C. for about 20 min. and 100μ thick dry film photoresist RISTON 730S (supplied by Du Pont) was contact-bonded onto it. Then a photomask having the desired pattern was superposed on it. UV ray was irradiated to it and washed with trichloroethane solution to remove unpolymerized photoresist. There were thus obtained test pieces consisting of a glass plate and fifty rectangular strips of cured photoresist adhered to the glass plate 5 mm in length and 50μ in width (corresponding to wall thickness L) as is shown in FIG. 10, each strip being arranged in parallel with the space of 100μ. The test pieces were immersed in the water at 80° C. for 200 hours, with the result that all the cured films were kept fixed tightly onto the glass plate.

Figure 11:
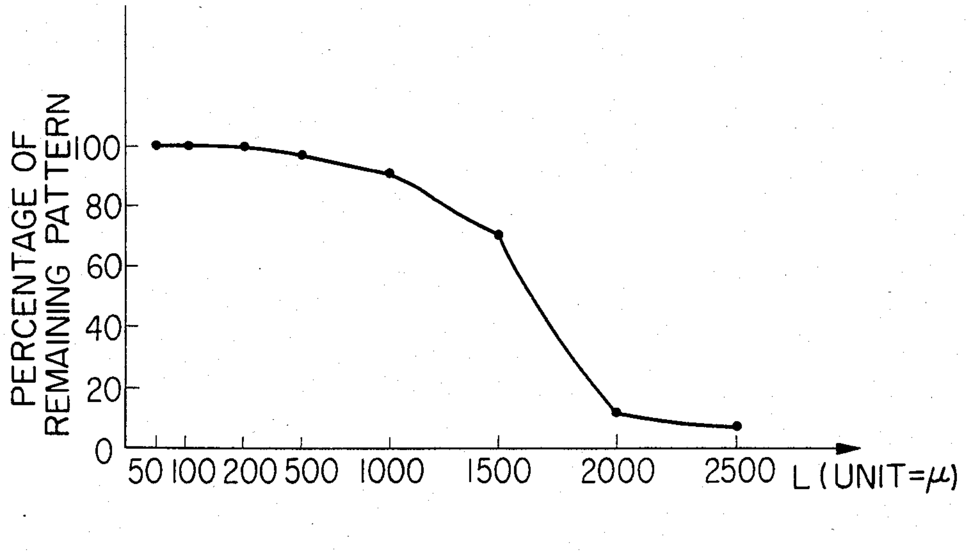
FIG. 11 shows the relation between the width (wall thickness) of the cured photosensitive resin film and the ratio of the remaining pattern (the ratio of cured films which did not peel off)

In the same manner as described above, the test pieces were prepared in which the width of the cured film (wall thickness) were made respectively 100μ, 200μ, 500μ, 1000μ, 1500μ, 2000μ and 2500μ, and the same immersion tests were repeated. The result is shown in FIG 11. In cases where the width of the cured film was 200μ or less, peeling of the cured films off the glass plates was not observed at all, while if the width of the cured film was more than 1500μ, the ratio of the peeling-off of the film increased remarkably.

EXAMPLES 1 AND 2, AND COMPARATIVE EXAMPLE

Figure 12:
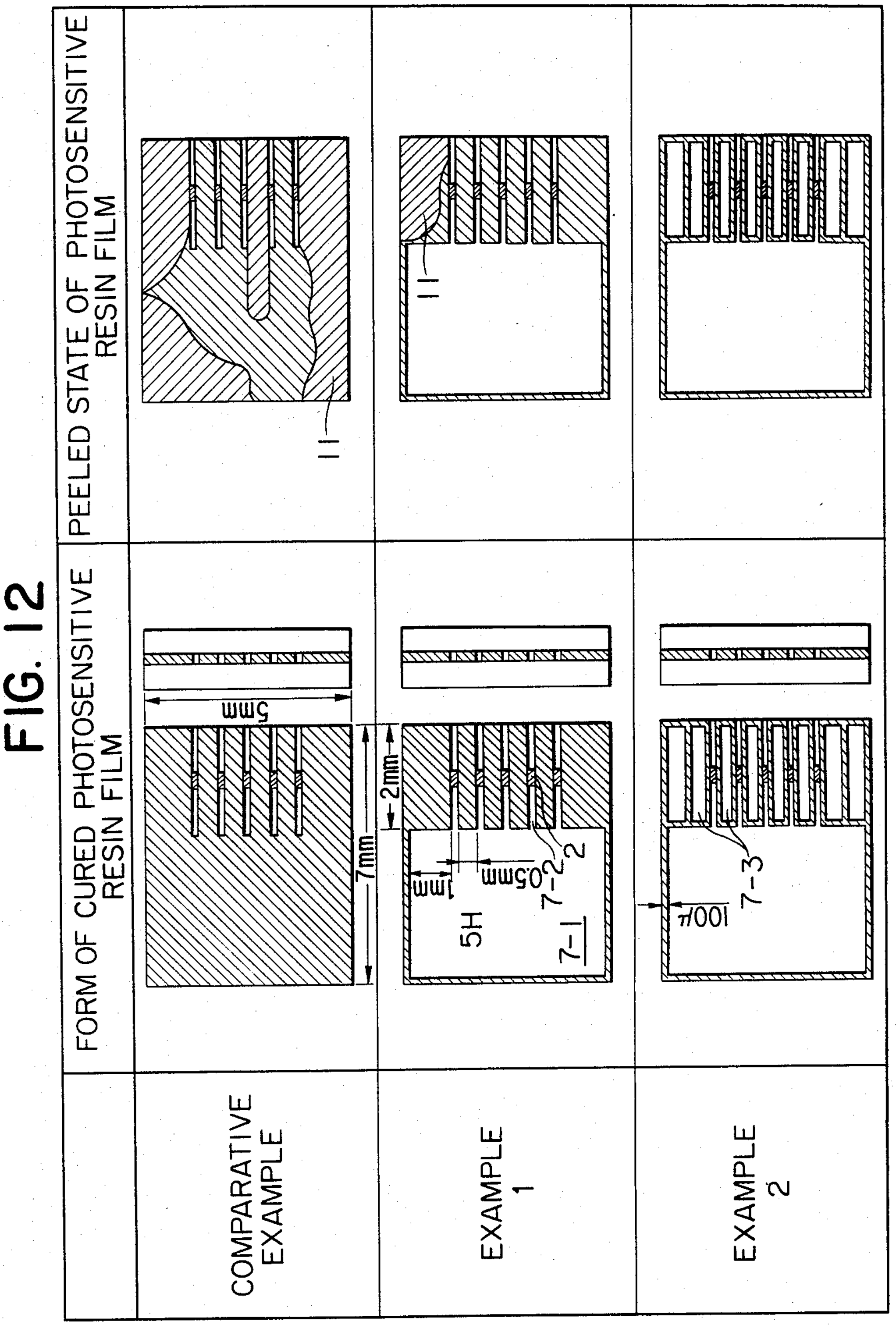
FIG. 12 shows schematically the shape of the cured photosensitive resin film of the recording head prepared experimentally and the state of peeling after the durability test.

According to the procedure described above (as shown in FIGS. from 1 to 9), twelve ink jet recording heads having five discharge outlets respectively were experimentally fabricated. In this case the photomask was used which can give the photosensitive resin film of the shape and dimension shown in FIG. 12.

The durability test was performed by immersing these test heads in the ink composition consisting of 80% ethyleneglycol, 5% N-methyl-2-pyrrolidone, 12% water, 3% Direct Black 38 at 50° C. for 200 hours. After the durability test, the state of bonding of the cured photosensitive resin film with the substrate and the covering was observed with the result shown in FIG. 12. None of the heads of Example 2 showed the peeling-off, but among the heads of Example 1, 4 heads were observed to have peeled off in the position as shown in the figure. On the other hand, all the heads in the Comparative example showed the peeling-off.

Other lots each with 20 heads mentioned above were tested for printing performance. The numbers of acceptable heads which did not decrease in droplet discharging and printing performances were 17/21 in Example 1, 20/20 in Example 2, and 2/20 in Comparison example. The thickness of the cured photosensitive resin film was about 100μ.

What we claim is:

1. An ink jet recording head made by laminating on a substrate a cured photosensitive resin film for forming ink pathways on said substrate and a cover of said pathways, characterized in that the wall thickness of said ink pathways formed by said cured photosensitive resin film is not more than 15 times the film thickness of said cured photosensitive resin film.

2. An ink jet recording head made by laminating on a substrate a cured photosensitive resin film for forming ink pathways on said substrate and a cover of said pathways, characterized in that grooves and/or spaces for reducing contact area are formed between said substrate and/or said cover and the photosensitive resin film in addition to the space for ink pathways.

* * * * *

UNITED STATES PATENT AND TRADEMARK OFFICE

CERTIFICATE OF CORRECTION

PATENT NO. : 4,509,063

DATED : April 2, 1985

INVENTOR(S) : HIROSHI SUGITANI, ET AL.

It is certified that error appears in the above-identified patent and that said Letters Patent is hereby corrected as shown below:

Column 1, line 17, after "known" delete "as";

line 18, after "example" insert -- , --.

Column 2, line 58, after "pressure" insert --generating elements 2 for ink discharge, heating elements--.

Signed and Sealed this

*Twenty-fifth* Day of *February 1986*

[SEAL]

*Attest:*

DONALD J. QUIGG

*Attesting Officer* *Commissioner of Patents and Trademarks*